(12) United States Patent
Pettey et al.

(10) Patent No.: US 11,141,765 B2
(45) Date of Patent: Oct. 12, 2021

(54) EXTRUDED BAR STOCK

(71) Applicant: RobotZone, LLC, Winfield, KS (US)

(72) Inventors: Brian T. Pettey, Winfield, KS (US); Kyle R. Lewis, Winfield, KS (US); Jason J. Jaeger, Winfield, KS (US)

(73) Assignee: Robotzone, LLC, Winfield, KS (US)

( * ) Notice: Subject to any disclaimer, the term of this patent is extended or adjusted under 35 U.S.C. 154(b) by 163 days.

(21) Appl. No.: 15/723,536

(22) Filed: Oct. 3, 2017

(65) Prior Publication Data

US 2018/0099319 A1 Apr. 12, 2018

Related U.S. Application Data

(60) Provisional application No. 62/405,390, filed on Oct. 7, 2016.

(51) Int. Cl.
*B21C 23/12* (2006.01)
*B29C 48/09* (2019.01)
*B21C 23/14* (2006.01)
*F16C 29/04* (2006.01)
*F16C 29/02* (2006.01)

(52) U.S. Cl.
CPC ............ *B21C 23/12* (2013.01); *B21C 23/142* (2013.01); *B29C 48/09* (2019.02); *F16C 29/02* (2013.01); *F16C 29/045* (2013.01); *F16C 29/048* (2013.01); *F16C 2220/48* (2013.01)

(58) Field of Classification Search
CPC ........ E04C 3/28; E04C 3/36; E04C 2003/043; E04C 2003/0421; E04C 3/32; E04C 2003/0439; E04C 2003/0465; E04C 2003/0473; F16C 29/02
See application file for complete search history.

(56) References Cited

U.S. PATENT DOCUMENTS

| | | | | |
|---|---|---|---|---|
| 3,612,585 A | * | 10/1971 | Mayr | E06B 3/98 403/264 |
| 5,429,438 A | * | 7/1995 | Wood | F16C 29/02 384/26 |
| 5,690,239 A | * | 11/1997 | Ballard | A47F 5/04 211/187 |
| 6,461,046 B2 | * | 10/2002 | Kahl | B23Q 1/262 384/40 |

(Continued)

FOREIGN PATENT DOCUMENTS

| DE | 19830566 A1 | * 1/2000 | ............ B21C 23/14 |
|---|---|---|---|
| EP | 0821122 A1 | 1/1998 | |

(Continued)

OTHER PUBLICATIONS

International Written Opinion and Search Report, dated Jan. 8, 2018, 15 pages, from PCT//US2017/054906.

(Continued)

*Primary Examiner* — Christine T Cajilig
(74) *Attorney, Agent, or Firm* — Wesley Malherek; Kelly, Holt & Christenson PLLC

(57) ABSTRACT

An extrusion profile comprises a center aperture. The extrusion profile also comprises a peripheral aperture. The profile also comprises a first set of drill guides corresponding to a vertical center of the center aperture and a second set of drill guides corresponding to a horizontal center of the center aperture.

9 Claims, 9 Drawing Sheets

(56) References Cited

U.S. PATENT DOCUMENTS

| | | | | |
|---|---|---|---|---|
| 6,485,178 | B1 * | 11/2002 | Koban | B23Q 1/58 |
| | | | | 384/39 |
| D676,576 | S * | 2/2013 | Oetlinger | D25/121 |
| 8,474,213 | B2 * | 7/2013 | Oetlinger | E05D 5/0238 |
| | | | | 52/655.1 |
| 9,115,741 | B2 * | 8/2015 | Oetlinger | E05D 5/0238 |
| D801,551 | S * | 10/2017 | Boehl | D25/126 |
| 2004/0096129 | A1 * | 5/2004 | Schmalzhofer | B23Q 1/58 |
| | | | | 384/42 |
| 2009/0080816 | A1 * | 3/2009 | Schroeder | F16C 29/005 |
| | | | | 384/42 |
| 2010/0150484 | A1 * | 6/2010 | Watson | F16C 29/004 |
| | | | | 384/55 |
| 2011/0176860 | A1 * | 7/2011 | Lin | F16B 7/025 |
| | | | | 403/119 |
| 2014/0326091 | A1 | 11/2014 | Evans | |

FOREIGN PATENT DOCUMENTS

| | | | | |
|---|---|---|---|---|
| EP | 1749948 A2 * | 2/2007 | | E04B 2/7818 |
| FR | 1588281 A * | 4/1970 | | E04B 2/766 |
| WO | WO-9500727 A1 * | 1/1995 | | E04C 3/06 |
| WO | WO-2015183187 A1 * | 12/2015 | | E04C 3/04 |

OTHER PUBLICATIONS

PCT/US2017/054906, International Preliminary Report on Pateniablity, dated Apr. 18, 2019, 13 pages.

* cited by examiner

EXTRUDED BAR STOCK

CROSS-REFERENCE TO RELATED APPLICATION

The present application is based on and claims the benefit of U.S. provisional patent application Ser. No. 62/405,390, filed Oct. 7, 2016, the content of which is hereby incorporated by reference in its entirety.

BACKGROUND

Hobby robotics is a growing industry. In this industry, it is common to use various motion and structural components to build a project. Motion components can include stepper or servo motors, linear actuators, shafts, devises, gears, etc. Structural components can include channels, extrusions, beans, brackets, blocks, hubs, etc. One such extrusion is the 80/20® t-slotted aluminum extrusion made by 80/20®, Inc.

The 80/20® extrusion provides light weight framing that can customized through the t-slotted channels that run along its length. Various types of accessories have been designed that are compatible with the T slot channel of the 80/20® extrusion.

SUMMARY

An extrusion profile comprises a center aperture. The extrusion profile also comprises a peripheral aperture. The profile also comprises a first set of drill guides corresponding to a vertical center of the center aperture and a second set of drill guides corresponding to a horizontal center of the center aperture.

DETAILED DESCRIPTION OF ILLUSTRATIVE EMBODIMENTS

Figure 1:
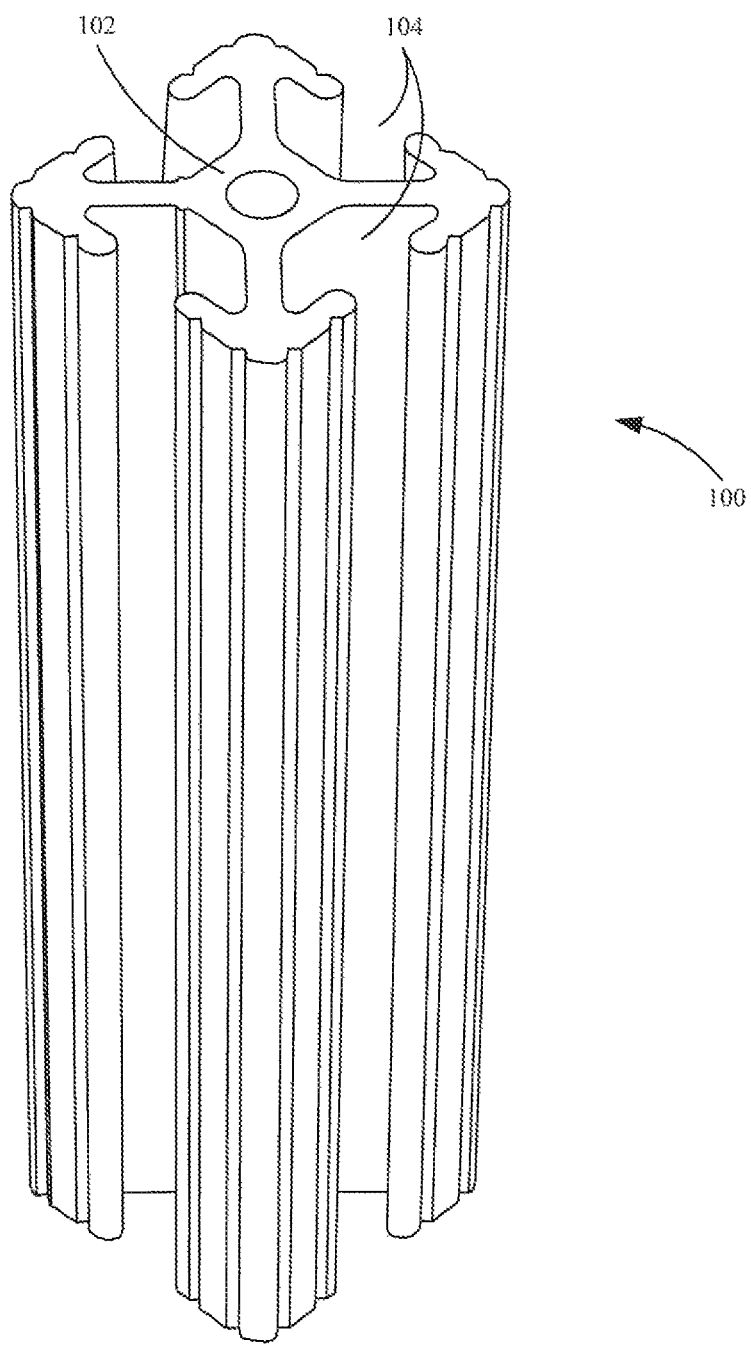
FIG. 1 illustrates a prior art extrusion.

FIG. 1 illustrates a prior art extrusion profile. Extrusion 100 comprises a hollow center 102 and T slot channels 104. An example of prior art extrusion 100 is described in U.S. Pat. No. 5,429,438. Hollow center 102 is designed to route electrical wires or pressurized air there through. T slot channels 104 are used to connect extrusion 100 to other extrusions, slides or objects.

Figure 2:
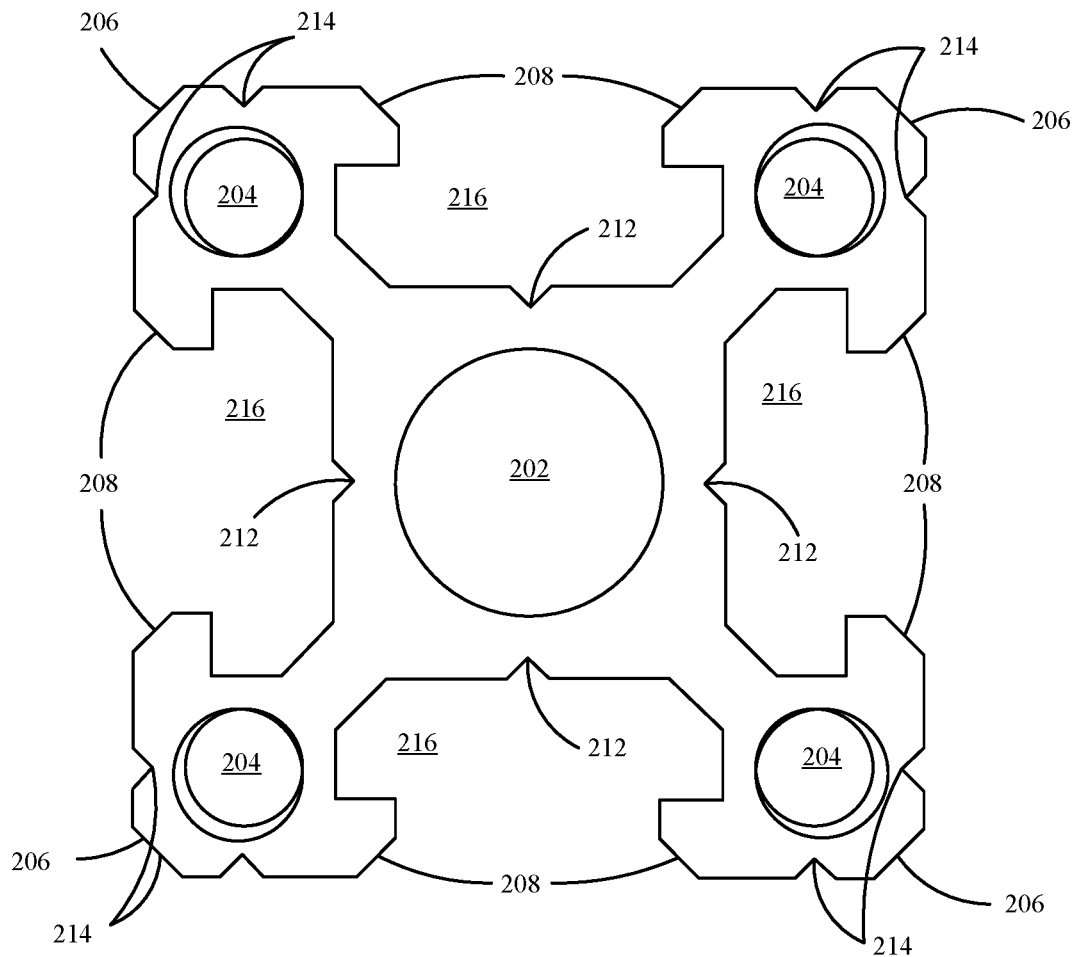
FIG. 2 illustrates a round bore extrusion profile, in accordance with an example of the present invention.
Figure 2:

FIG. 2 illustrates a round bore extrusion profile, in accordance with an example of the present invention. In the shown example, extrusion 200 comprises a center aperture 202, peripheral apertures 204 and channels 216. Extrusion 200 has a substantially square shape, however, extrusion 200 may be in any other shape, i.e. rectangle, hexagon, round, etc. Channels 216 can be similar to the T slot channels of the prior art. Channels 216 can also be a different type of channel. Center aperture 202 can be sized to a specific diameter as needed by the user. In one example, center aperture 202 has a diameter that is slightly oversized to receive a quarter inch rod. In one example, center aperture 202 has a diameter of 0.2501". Center aperture 202 is associated with guides 212. Guides 212 aid the user in modifying or interacting with center aperture 202. In one example, guides 212 are drill guides. In one example, guides 212 align with the center of center aperture 202, allowing a user to drill directly into the center of center aperture 202. In one example, guides 212 can be offset from center and parallelly align with a tangential line of center aperture 202.

Peripheral apertures 204 can be sized to a specific diameter as needed by the user. In one example, peripheral apertures 204 have a diameter suitable for tapping 6-32 threads. In one example, peripheral apertures have a 0.1065" diameter. In one example, peripheral apertures 204 are threaded. Peripheral apertures 204 can be oriented in a specific shape as needed by the user. As shown peripheral apertures 204 are oriented in a 0.770" square. Peripheral apertures 204 are associated with guides 214. The relationship between peripheral apertures 204 and guides 214 may be similar to the above listed relationships between center aperture 202 and guides 212.

Extrusion 200 also comprises outer bevels 206 and inner bevels 208. Outer bevels 206 can be shaped and sized as needed by the user. In one example, outer bevels 206 are shaped to allow extrusion 200 to snuggly fit in a standard inner diameter of an aperture/bearing. In one example, extrusion 200 from outer bevel 206 to the opposing bevel 206 is sized 1.0". Inner bevels 208 can be shaped and sized as needed by the user. In one example, inner bevels 208 have a profile that aligns with a V wheel, allowing the V wheel to run radially along the length of the extrusion 200.

Figure 3:
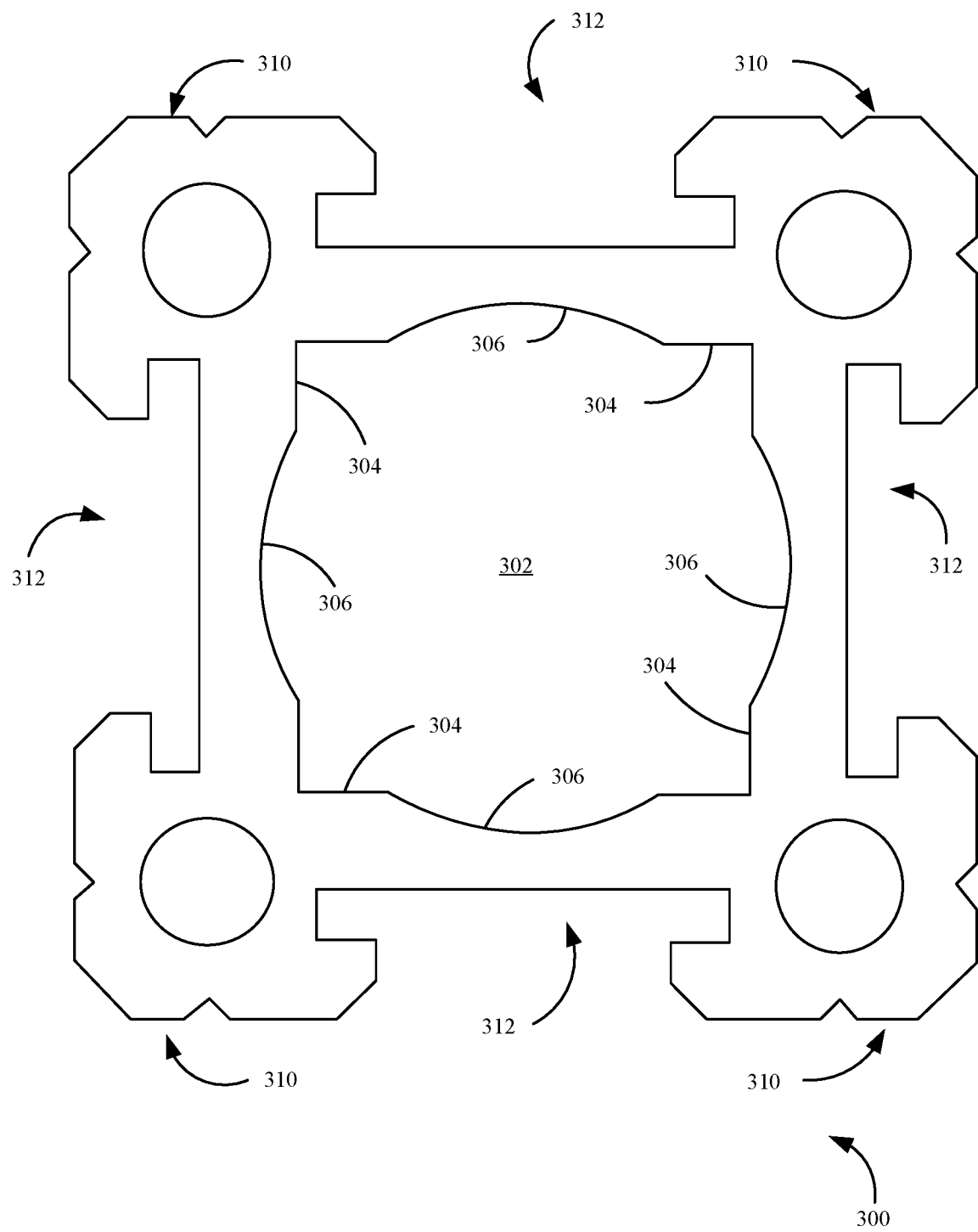
FIG. 3 illustrates a dual feature bore extrusion profile, in accordance with an example of the present invention.

FIG. 3 illustrates a dual feature bore extrusion profile, in accordance with an example of the present invention. In the shown example, extrusion 300 comprises a center aperture 302 and an outer profile 310. Outer profile 310 may be similar to the outer profile of extrusion 200 in FIG. 2. Outer profile 310 may also be different than the outer profile of extrusion 200 in FIG. 2. Center aperture 302 comprises a noncircular feature 304 and a circular feature 306. In one example, the circular feature 306 has a diameter that corresponds to a standard size (bearing, shaft, etc.). In one example, circular feature 306 has a 0.375" diameter. In one embodiment, circular feature 306 is configured to receive a bearing or shaft. Noncircular feature 304, as shown is a square. However, noncircular feature 304 may be any other suitable shape as needed by the user. Noncircular feature 304 may provide the advantage of preventing slipping or rotating of an object inserted into noncircular feature 304. Noncircular feature 304 can, in one example, be shaped and sized to a standardized size (linear drive, nut, etc.).

FIG. 4 illustrates an open bore extrusion profile, in accordance with an example of the present invention. In the shown example, extrusion 400 comprises a center aperture 402, opening 420 and an outer profile 410. Outer profile 410 and channel 412 may be similar to those of extrusion 200 in FIG. 2. Outer profile 410 and channels 412 may also be different than those of extrusion 200 in FIG. 2. Center aperture 402 comprises a circular feature 406 and a noncircular feature 404 similar to the center aperture 302 of FIG. 3. However center aperture 402 has an opening 420. Opening 420 can allow extrusion 400 to straddle a component located in center aperture 402. In one example, a component is a lead screw nut or block. Although opening 420 creates an opening in the profile of extrusion 400 there are still may be a channel 412 on all sides of the extrusion 400.

Figure 4A:
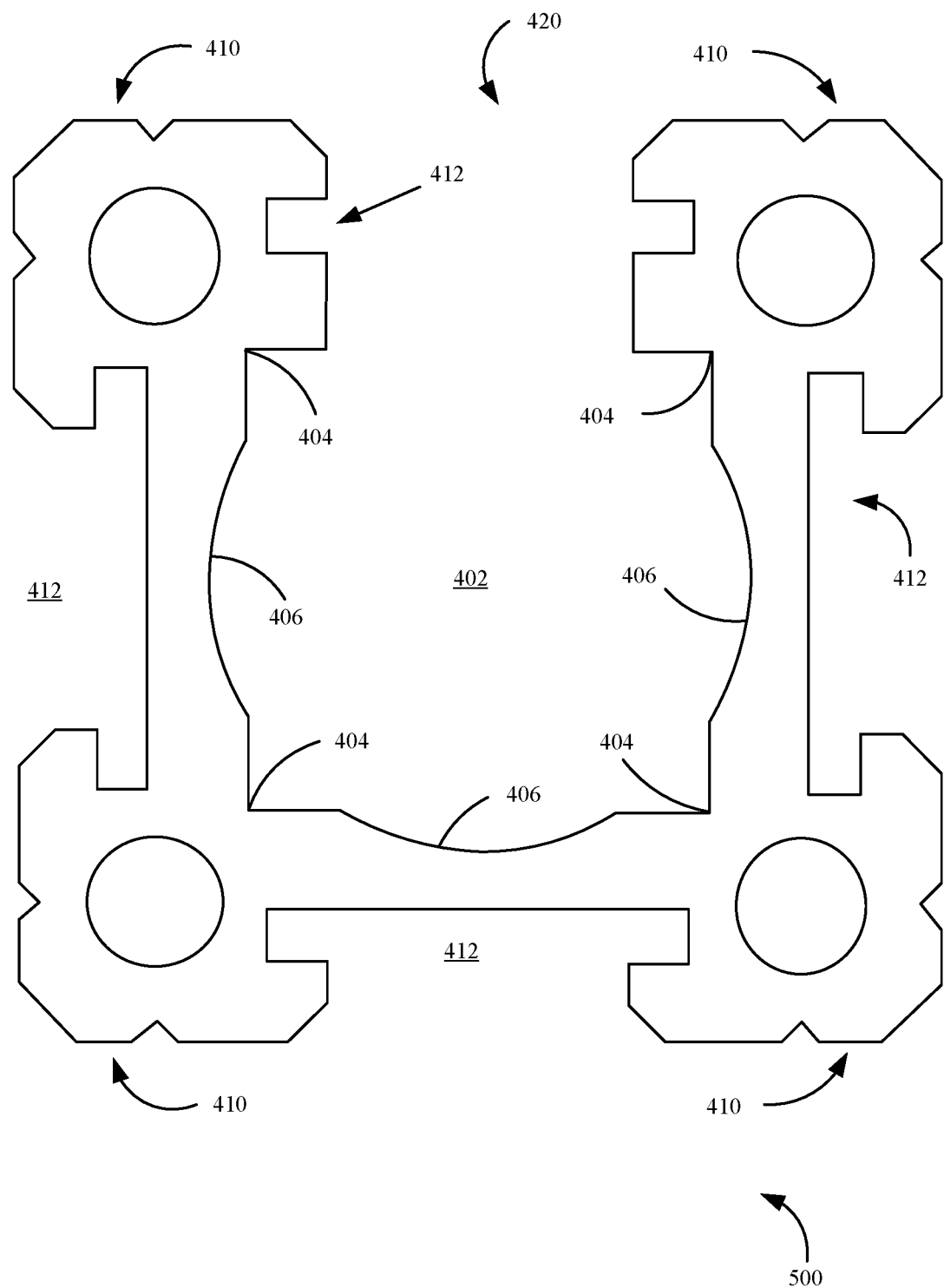
FIG. 4A illustrates an open bore extrusion profile, in accordance with an example of the present invention.
Figure 4B:
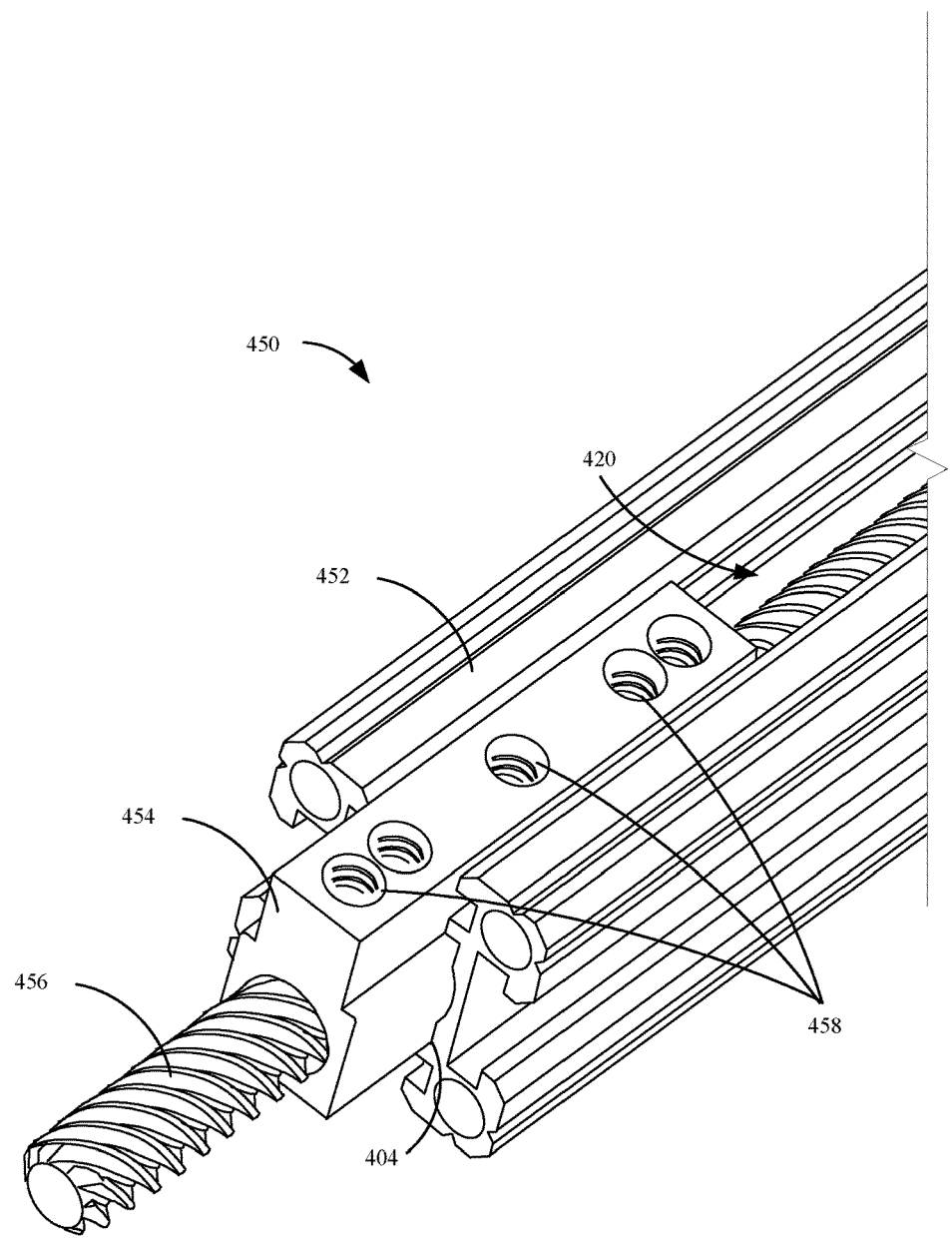
FIG. 4B illustrates an open bore extrusion assembly, in accordance with an example of the present invention.

FIG. 4B illustrates an open bore extrusion assembly 450, in accordance with an example of the present invention. Assembly 450 comprises an extrusion 452, a lead screw block 454 and a lead screw 456. Extrusion 452 has an opening 420 which retains lead screw block 454. As lead screw 456 rotates lead screw block 454 is driven laterally along extrusion 452. In one example, lead screw block 454 aligns with and contacts noncircular feature 404 of the profile of extrusion 452 to prevent lead screw block 454 from rotating. In one example, if lead screw block 454 is allowed to rotate with lead screw 456 there may be some backlash effect or other linear motion inefficiencies.

Lead screw block 454 comprises mounting features 458. As shown mounting features 458 are threaded apertures. These apertures can be spaced and sized as needed by the user. Mounting features 458 a lower component to be mounted to lead screw block 454, such that when lead screw block 454 is driven so is the component. In another example, lead screw block 454 is replaced by a lead screw nut that may attach to a component.

The composition of lead screw block 454 and lead screw 456 may be determined based on strength and friction criteria. In one example, lead screw block 454 may comprise a brass material. In one example, lead screw block 454 may comprise a bronze material. In another example, lead screw block 454 may comprise a different material. In one example, lead screw 456 comprises a stainless-steel material. In another example, lead screw 456 may comprise a different material.

Figure 4C:
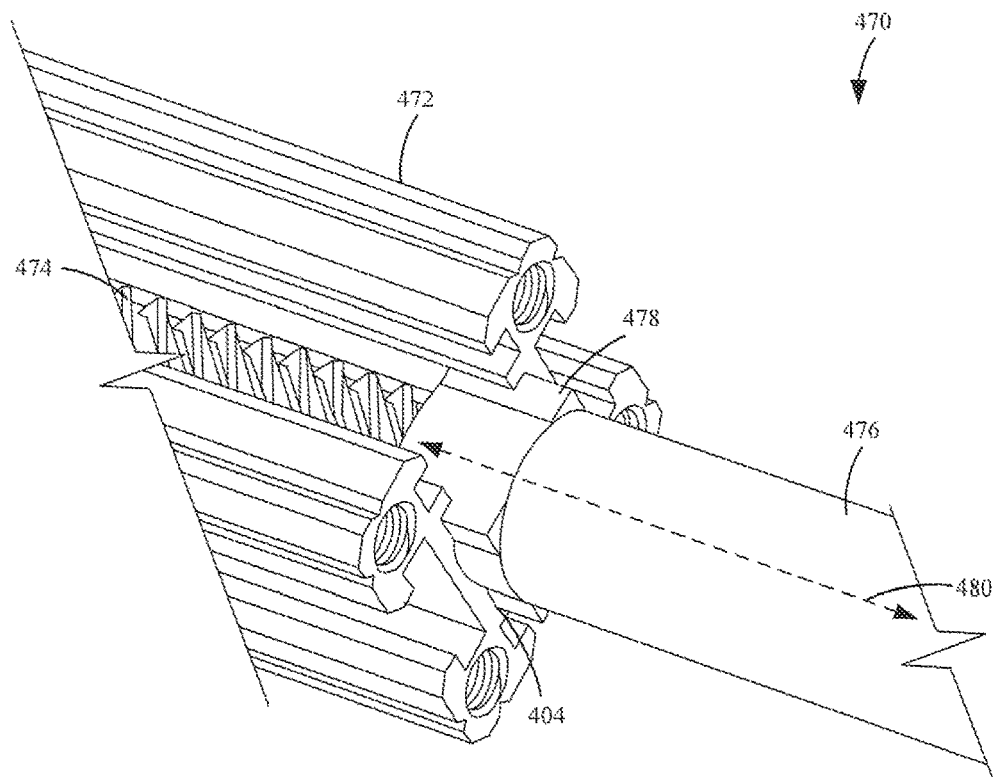
FIGS. 4C-D illustrate an open bore extrusion in a linear actuator assembly, in accordance with an example of the present invention.

FIG. 4C illustrates an open bore extrusion in an extended linear actuator assembly, in accordance with an example of the present invention. Assembly 470 comprises an extrusion 472 a lead screw 474, an actuator tube 476 and a lead screw nut 478. Extrusion 472 defines a actuating axis 480 along which actuator tube 476 is driven. Actuator tube 476 is driven by lead screw nut 478 via lead screw 474. As lead screw 474 is rotated it drives lead screw nut 478 and actuator tube 476 along actuating axis 480. Actuator tube 476 is hollow to allow actuator tube 476 to retract within extrusion 472.

One potential limit on the force actuator tube 476 can exert is the amount of friction between lead screw 474 and lead screw nut 478. Lead screw nut 478, in one example, comprises a brass or bronze material to reduce friction. In one example, lead screw nut 478 comprises a ball screw nut or a roller screw nut. Lead screw nut 478 aligns with and contacts noncircular feature 404 of the profile of extrusion 472 to prevent lead screw nut 478 from rotating. In one example, if lead screw nut 478 is allowed to rotate with lead screw 474 there may be some backlash effect or other linear motion inefficiencies.

Figure 4D:
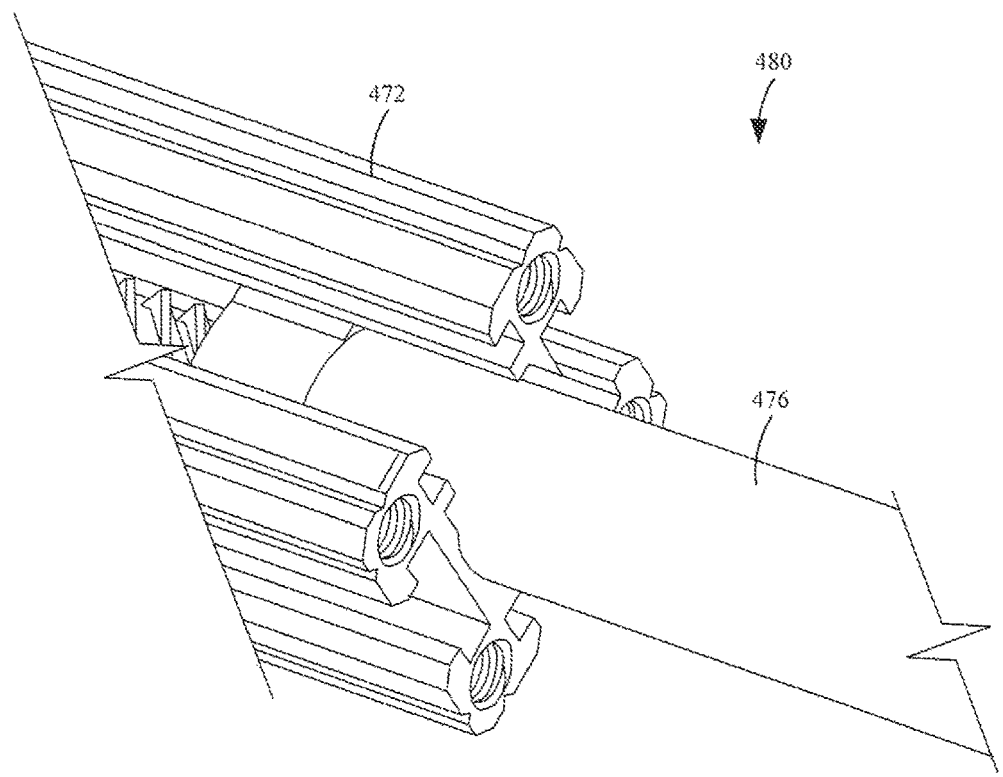

FIG. 4D illustrates an open bore extrusion in a partially retracted linear actuator assembly, in accordance with an example of the present invention. Assembly 480 comprises extrusion 472, lead screw 474, actuator tube 476 and lead screw nut 478. These are the same components as those in FIG. 4C although actuator tube 476 is partially retracted within extrusion 472.

Figure 5A:
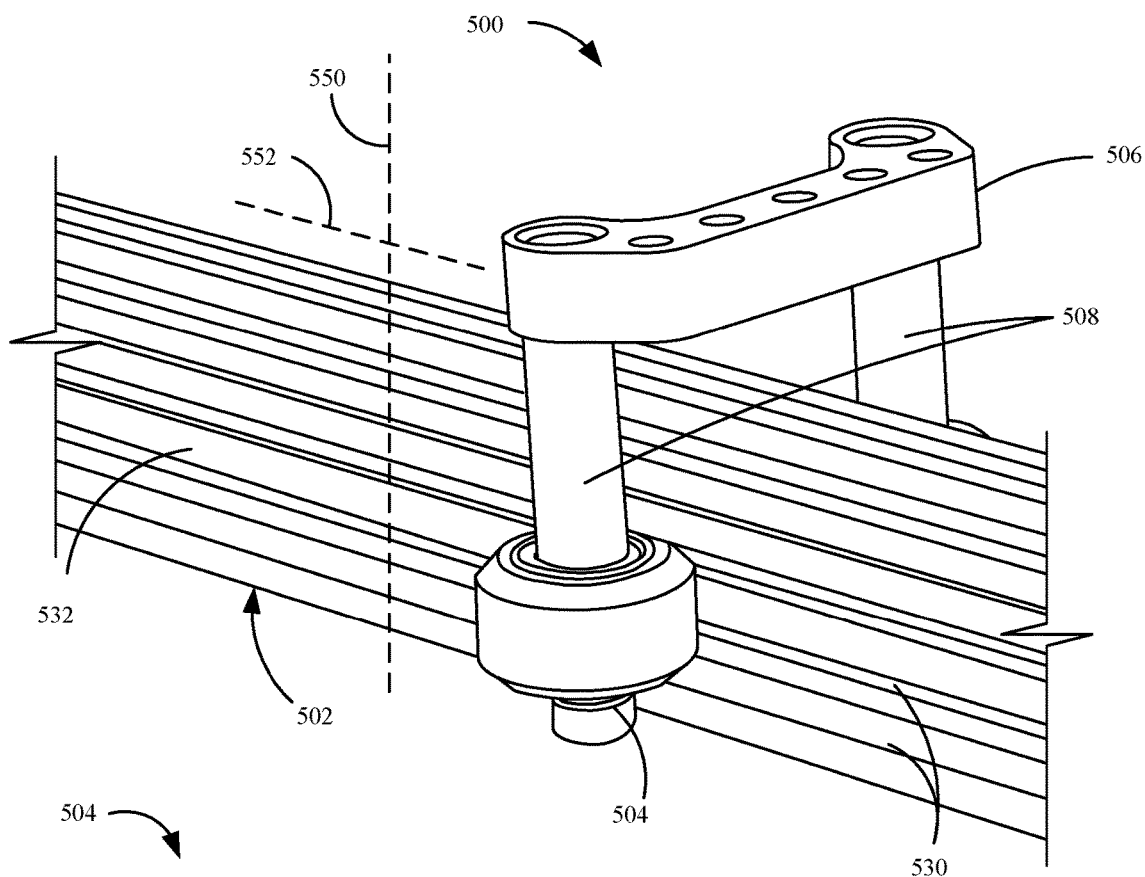
FIG. 5A-C illustrate an extrusion assembly and its components, in accordance with an example of the present invention.

FIG. 5A illustrates an example of an extrusion assembly. In the shown example, assembly 500 comprises extrusion 502, roller bracket 506 and wheel 504. Roller bracket 506 travels down the length of extrusion 502 with the aid of wheels 504. In one embodiment, wheels 504 contact extrusion 502 at bevels 530.

Figure 5B:
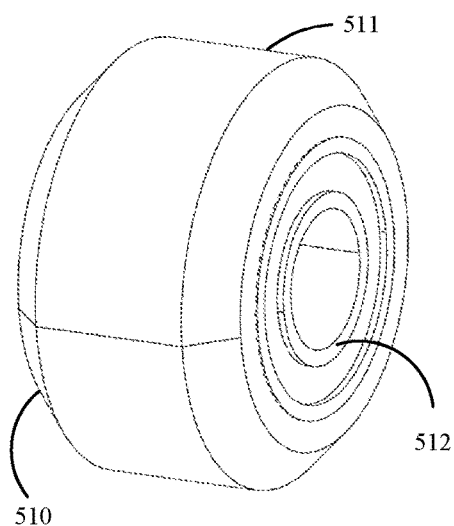

FIG. 5B illustrates wheel 504 in greater detail. In the shown example, wheel 504 comprises beveled edges 510, periphery 511 and bearing 512. Beveled edges 510 contact bevels 530 of extrusion 502. Periphery 511 may be wider or narrower depending on the width of channel 532. Due to the V shape of beveled edges 510, wheel 504 is centered within channel 532. This V-shaped also prevents wheel 504 from moving in the vertical direction 550 and ensures wheel 504 only moves in the lateral direction 552. To reduce friction between wheel 504 and standoff 508, wheel 504 has a bearing 512.

Figure 5C:
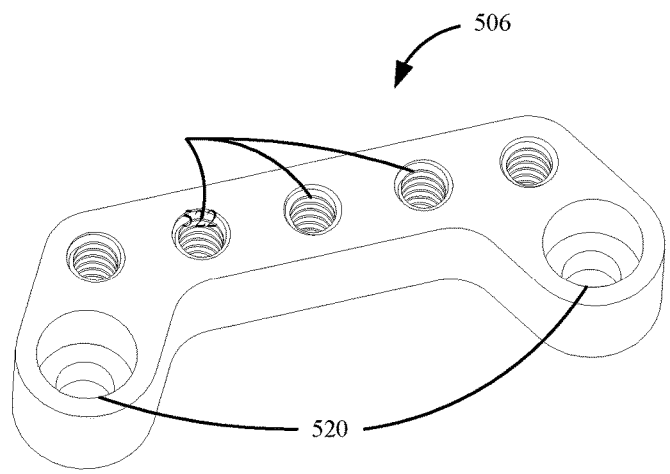

FIG. 5C illustrates roller bracket 506 in greater detail. In the shown example, roller bracket 506 comprises wheel mounts 520 and accessory mounts 522. Wheel mounts 520 are spaced just wide enough so that wheels 504 contact extrusion 502. Accessory mounts 522 as shown are threaded apertures configured to receive fasteners from an accessory.

Figure 6:
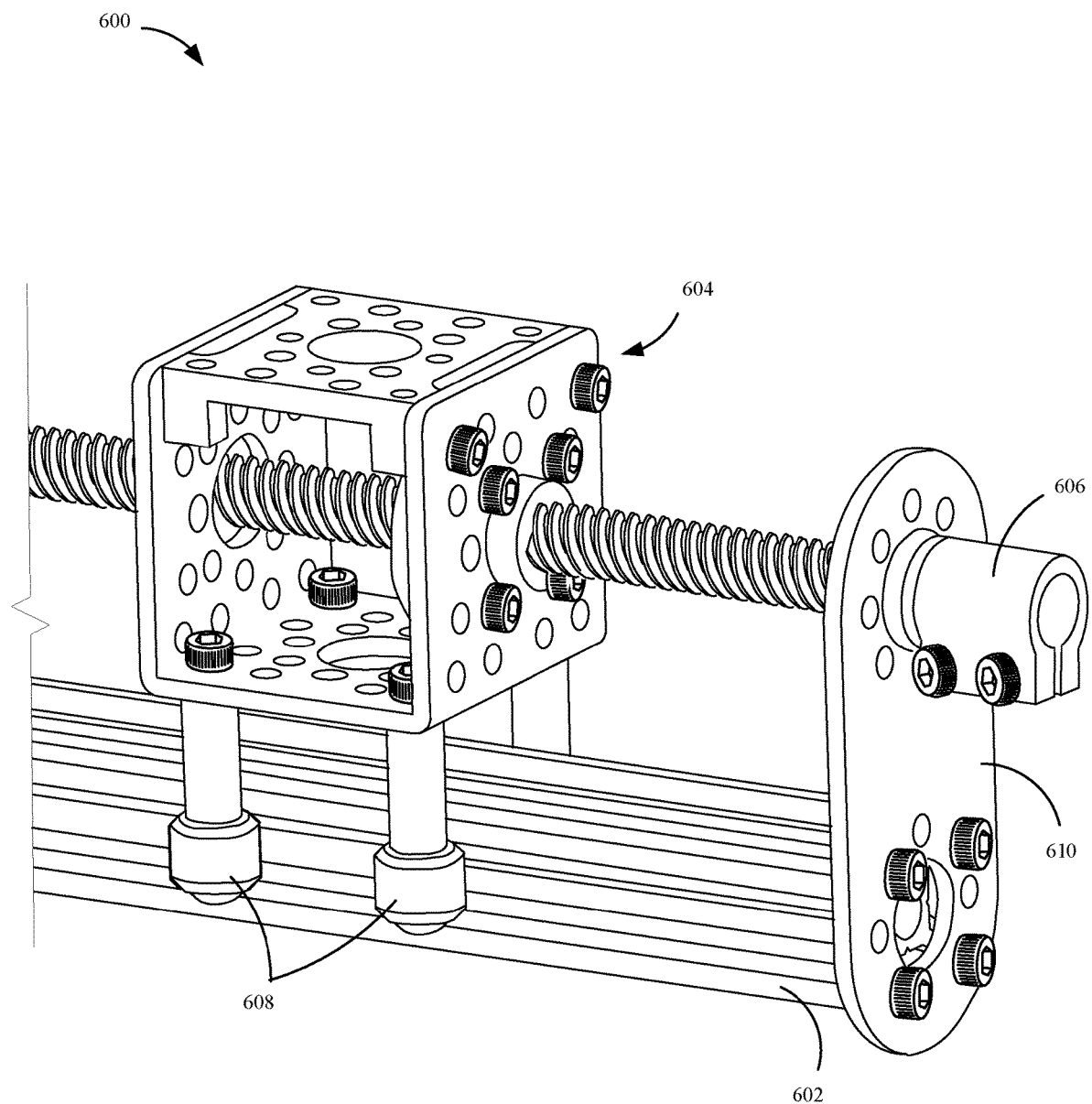
FIG. 6 illustrates an extrusion assembly, in accordance with an example of the present invention.

FIG. 6 illustrates an extrusion assembly, in accordance with an example of the present invention. In the shown example, assembly 600 comprises extrusion 602, carriage 604, driving mechanism 606 and end bracket 610. In this assembly, carriage 604 is driven linearly along extrusion 602 by driving mechanism 606. Linear motion of carriage 604 is guided by wheels 608. Driving mechanism 606 is secured to extrusion 602 by end bracket 610. And bracket 610 is secured to extrusion 602 by threaded fasteners. In one example, the threaded fasteners are socket cap screws that are threaded into the threaded peripheral holes of extrusion 602. In another example, driving mechanism 606 may be located within extrusion 602 similar to the example of FIG. 4B.

Figure 7A:
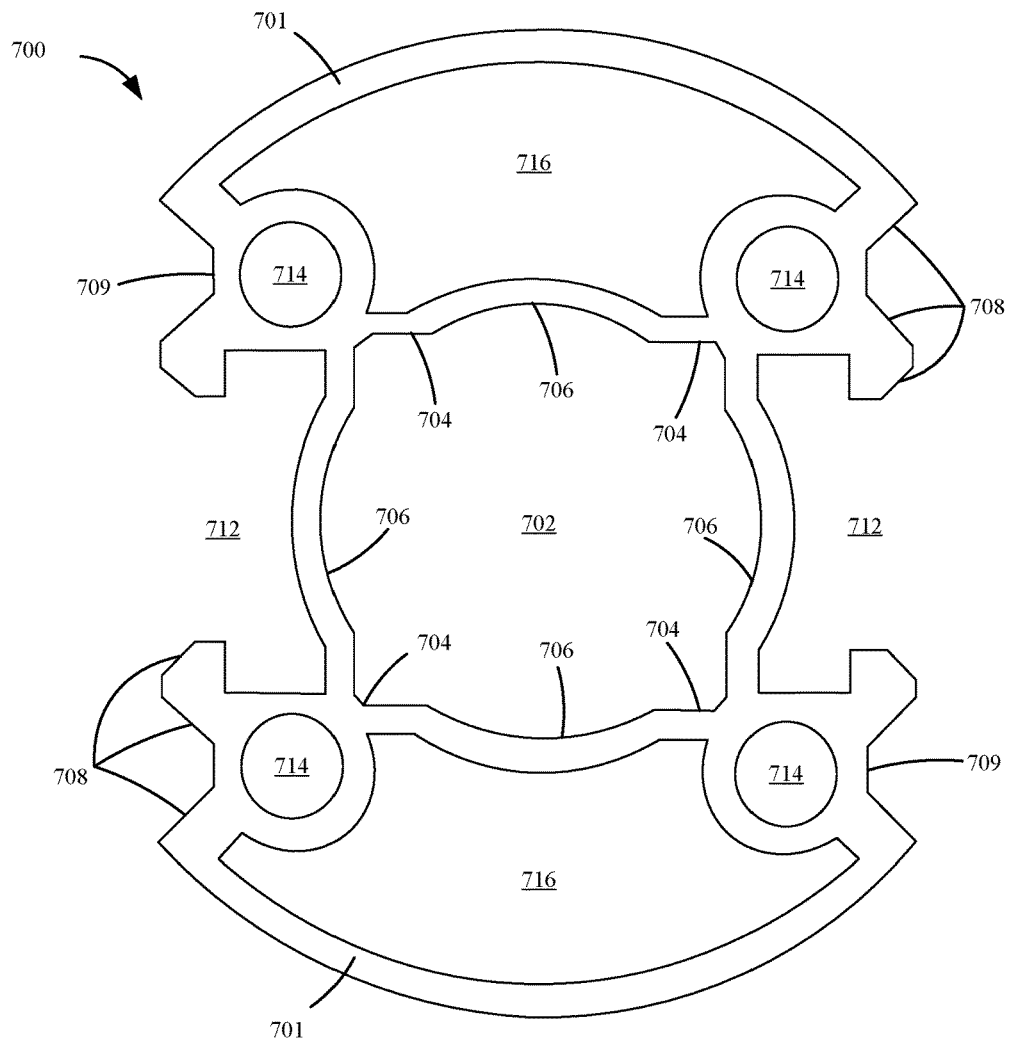
FIGS. 7 A-C illustrate circular extrusion profiles, in accordance with examples of the present invention.

FIG. 7A illustrates a circle extrusion profile, in accordance with an example of the present invention. Profile 700 comprises an outer profile 701, a center bore 702, channels 712, peripheral bores 714 and hollow portions 716. As shown outer profile 701 comprises two quarter circle portions located substantially on opposite sides of profile 700. Outer profile 701 can comprise other non-circular features, in other examples. As shown, outer profile 701 defines the footprint of profile 700. Outer profile 701 can be shaped and sized as needed by the user. For example, as shown, outer profile 701 defines a substantially circular shape that can snugly fit within an inner race of a bearing to allow the extrusion to be used as a shaft.

As shown between outer profiles 701 are channels 712. In one example channel 712 are standard T channels. Another example channels 712 are a different type of channel. As shown between channel 712 and outer profile 701 are bevels 708 and surfaces 710. In the shown example, there are 3 bevels 708 and one surface 710. In other examples, there may be fewer or greater amounts of bevels 708 and surfaces 710. Bevels 708 can align with different types of V wheels or bearings to allow linear motion along an extrusion with profile 700. Surfaces 710 can be sized to different widths to allow for different types of V wheels or bearings to mate with bevels 708. Surfaces 710 may also provide a flat area to drill into an extrusion for access to peripheral bores 714.

Located within profile 700 are hollow portions 716. Hollow portion 716 may be useful, in one example, to reduce weight of an extrusion having profile 700. As shown, there are two hollow portions 716, however other examples may have fewer or greater amounts of hollow portions 716. In one example, hollow portion 716 may be broken up by solid features to increase strength. Center bore 702 comprises noncircular features 704 and circular features 706. These features may be similar to the noncircular and circular features of FIG. 3. The peripheral bores 714 may also be similar to the peripheral bores of FIG. 3.

Figure 7B:
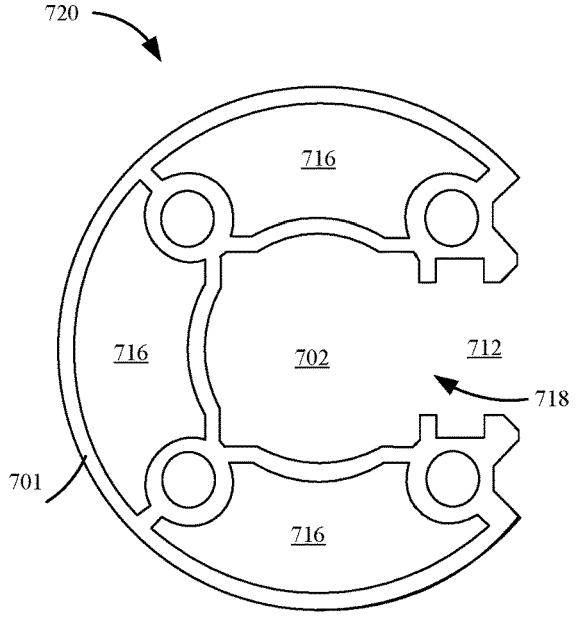

FIG. 7B illustrates a circular extrusion profile, in accordance with an example of the present invention. Extrusion 720 comprises similar components to those of FIG. 7A. However, extrusion 720 comprises an additional circular portion on outer profile 701 and one fewer channel 712. As shown, in place of the channel 712 there is another quarter circle of outer profile 701 and a hollow portion 716. Also shown in FIG. 7B is an opening 718 between center bore 702 and channel 712. In one example, opening 718 may be similar to the one of the openings of FIGS. 4A-D. In another example, opening 718 may be different than one of the openings of FIGS. 4A-D.

Figure 7C:
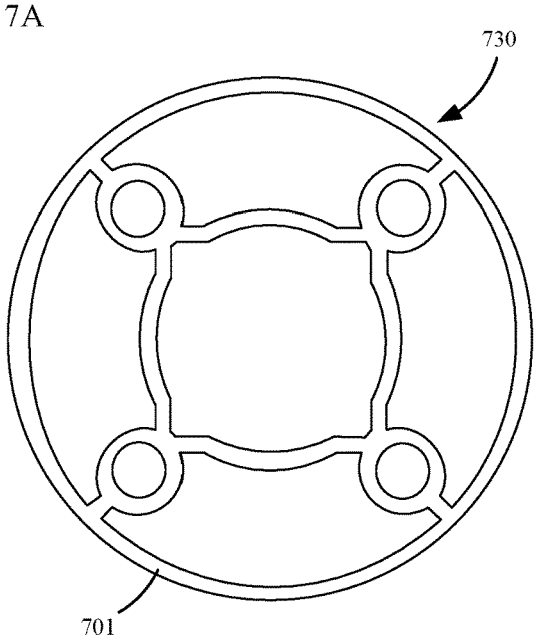

FIG. 7C illustrates circular extrusion profile, in accordance with an example of the present invention. Extrusion 730 comprises similar components to those of FIG. 7A. However, extrusion 730 does not have any channels 712. Instead, extrusion 730 has a completely circular outer profile 701. In the examples of FIGS. 7A-C, the channels are located on opposing sides (7A), on one side (7B) and on no sides (7C). In other examples, channels may be located on adjacent sides or on three sides. In some of these examples, there may be an opening 718.

Examples of the present invention provide many improvements and features not currently in use. One of these features include the centering drill guides. Another additional new feature is the circular and non-circular feature combination aperture. Another new feature is the peripheral 0.770" pattern. Another new feature is the sizing of the profile apertures to mate with or be threaded to match standard components. Another new feature are the beveled edges that correspond to v-wheels or bearings. Additionally, there are other new features disclosed herein not found in any past disclosures.

Although the present invention has been described with reference to preferred embodiments, workers skilled in the art will recognize that changes may be made in form and detail without departing from the spirit and scope of the invention.

What is claimed is:

1. An extrusion profile for an extruded bar comprising:
   a center aperture formed so as to include both a noncircular feature and a substantially circular feature;
   at least two peripheral apertures formed such that a center axis of each is equal distance from a center axis of the center aperture;
   an exterior profile having four sides;
   a channel, formed in one of the four sides, and located between two of the at least two peripheral apertures, a bottom surface of the channel being closer to a convex hull of the profile than the center axis of the center aperture;
   an opening formed in one of the four sides, the opening providing access to the center aperture; and
   wherein the at least one side having the channel includes an inner bevel and a lateral portion, the lateral portion between the inner bevel and the channel.

2. The extrusion profile of claim 1, wherein said at least two peripheral apertures comprises four peripheral apertures.

3. The extrusion profile of claim 2 and further comprising at least one drill guide formed so as to mark a center line of the center aperture.

4. The extrusion profile of claim 1 wherein said at least two peripheral apertures comprise four peripheral apertures organized in a 0.770" diagonal square configuration.

5. The extrusion profile of claim 1, wherein the center aperture is formed with an opening in one side that causes a cross section of the extruded bar stock to be similar in shape to a shape of the letter "C".

6. The extrusion profile of claim 1 wherein the center aperture is formed with an opening in one side that causes it to have a profile substantially similar to the shape of the letter "C".

7. The extrusion profile of claim 6, wherein the opening in one side is configured to operate as an opening through which an accessory can protrude out from the center aperture as the accessory moves up and down a length of the extruded bar while slidably secured within the center aperture.

8. The extrusion profile of claim 1, wherein the at least two peripheral apertures are configured to be threaded.

9. The extrusion profile of claim 1, and further comprising a drill guide formed to guide a drill toward a center axis of one of the at least two peripheral apertures.

* * * * *